US009342743B2

(12) United States Patent
Vullioud et al.

(10) Patent No.: US 9,342,743 B2
(45) Date of Patent: May 17, 2016

(54) METHOD FOR SUPPORTING AN OPERATOR IN MEASURING A PART OF AN OBJECT

(71) Applicant: TESA SA, Renens (CH)

(72) Inventors: Benjamin Vullioud, Vufflens-la-Ville (CH); Dikran Antreasyan, Meryin (CH); Milan Kocic, Pawtucket, RI (US)

(73) Assignee: TESA SA, Renens (CH)

( * ) Notice: Subject to any disclaimer, the term of this patent is extended or adjusted under 35 U.S.C. 154(b) by 239 days.

(21) Appl. No.: 14/293,988

(22) Filed: Jun. 2, 2014

(65) Prior Publication Data

US 2015/0347849 A1 Dec. 3, 2015

(51) Int. Cl.
*G09G 5/00* (2006.01)
*G06K 9/00* (2006.01)
*G02B 27/01* (2006.01)
*G06T 19/00* (2011.01)
*G06T 7/00* (2006.01)

(52) U.S. Cl.
CPC ........ *G06K 9/00671* (2013.01); *G02B 27/0101* (2013.01); *G02B 27/0172* (2013.01); *G06T 7/001* (2013.01); *G06T 7/0044* (2013.01); *G06T 19/006* (2013.01); *G02B 2027/014* (2013.01); *G02B 2027/0138* (2013.01); *G02B 2027/0141* (2013.01); *G06T 2207/30124* (2013.01); *G06T 2219/004* (2013.01)

(58) Field of Classification Search
None
See application file for complete search history.

(56) References Cited

U.S. PATENT DOCUMENTS

| | | | |
|---|---|---|---|
| 2002/0044104 A1 | 4/2002 | Friedrich et al. | |
| 2005/0228281 A1* | 10/2005 | Nefos | A61B 8/08 600/446 |
| 2006/0291849 A1* | 12/2006 | Shamir | G03B 7/08 396/334 |
| 2008/0177503 A1* | 7/2008 | Stockman | G01B 3/205 702/161 |
| 2012/0320088 A1* | 12/2012 | Ihara | G05B 23/0216 345/629 |
| 2013/0038633 A1* | 2/2013 | Maggiore | B01D 65/104 345/633 |
| 2013/0069985 A1* | 3/2013 | Wong | G02B 27/017 345/633 |
| 2013/0174205 A1* | 7/2013 | Jacobsen | H04N 21/43637 725/81 |
| 2013/0307856 A1* | 11/2013 | Keane | G10L 21/10 345/473 |
| 2014/0009494 A1* | 1/2014 | Kasahara | G06K 9/00671 345/633 |
| 2014/0292807 A1* | 10/2014 | Raffa | G06T 19/006 345/633 |
| 2015/0070347 A1* | 3/2015 | Hofmann | G06K 9/00208 345/419 |
| 2015/0130835 A1* | 5/2015 | Daly | G06T 11/00 345/633 |
| 2015/0317518 A1* | 11/2015 | Fujimaki | G06K 9/00671 345/633 |
| 2015/0323993 A1* | 11/2015 | Levesque | G02B 27/0172 345/156 |
| 2015/0331576 A1* | 11/2015 | Piya | G06F 3/0481 715/850 |
| 2016/0005189 A1* | 1/2016 | Gray | G06K 9/00456 345/633 |
| 2016/0055674 A1* | 2/2016 | Mullins | G02B 27/017 345/633 |

FOREIGN PATENT DOCUMENTS

| | | |
|---|---|---|
| EP | 1295099 B1 | 9/2011 |
| FR | 2949587 A1 | 3/2011 |
| WO | 01/96829 A1 | 12/2001 |

* cited by examiner

*Primary Examiner* — David H Chu
(74) *Attorney, Agent, or Firm* — Maschoff Brennan

(57) ABSTRACT

Method for supporting an operator in measuring a part of an object, comprising the steps of equipping the operator with an electronic device and with a dimension measuring apparatus. The device comprises a see-though head mounted display, a camera, and a digital processor. An image of the object is captured with the camera so that the processor recognizes or identifies the part of the object in the image. The method further comprises the steps of obtaining a model of said part and displaying on the display an indication of the dimension that is intended to be measured. A value of the dimension measured by the dimension measuring apparatus is acquired in the processor that will process it according to the model.

19 Claims, 2 Drawing Sheets

METHOD FOR SUPPORTING AN OPERATOR IN MEASURING A PART OF AN OBJECT

FIELD OF THE INVENTION

The present invention concerns an augmented reality device and a method for supporting an operator in executing a metrology operation.

DESCRIPTION OF RELATED ART

Augmented reality (AR) devices for supporting job in testing inspections and in assembly procedures are known in the art.

Document FR2949587 discloses a method for computer assisted assembly. The operator disposes of an AR portable device displaying the working spaces with superposed computer generated visual information concerning assembly and quality operations steps. The AR device guides the operator through assembly steps without hardcopy plans and guides.

Document EP1295099 discloses a method and an AR system to support a tester during quality defects inspections in automobile domain. The system comprises a data processing unit and an AR user's equipment adapted for data inputting/outputting. The AR equipment supports the user during quality process by collecting data and by visualizing process steps as well as instruction to treat eventually detected quality defects.

Document US2002044104 discloses an AR system having a mobile apparatus for work sequences support, in particular by context-dependent insertion of assembly instructions. The system allows a remote supporting of an in-situ technician equipped by the AR mobile device by an expert located in a remote location. Information could be displayed by superimposing digital images visible by both eyes of technician. This information could comprise installation instructions, manipulations details and situation related instruction for the object being observed.

However, these AR devices are intended to support the operator mainly by providing instruction and information visualization and by providing remote supporting.

BRIEF SUMMARY OF THE INVENTION

An aim of the invention is to provide real-time data collection adapted for real-time quality monitoring of measuring operations.

Another aim of the invention is to speed up measuring operations and reduce service operations costs.

According to the invention, these aims are achieved by means of a method for supporting an operator in measuring a part of an object, comprising the steps of:

equipping the operator with
  an electronic device comprising a display, at least one camera, and a digital processor; and with
  a dimension measuring apparatus;
capturing an image of the object with said at least one camera;
recognizing and/or identifying with the processor the part of the object in the image;
obtaining a model of the part of the object;
displaying on the display an indication of the dimension that is intended to be measured;
acquiring in the processor a value of the dimension measured by the dimension measuring apparatus;
processing such value based on the model.

In a preferred embodiment, the method further comprises a step of suggesting, by means of the electronic device, an operative procedure for measuring the dimension with the dimension measuring apparatus.

In an embodiment, the step of displaying on the display an indication of the dimension that is intended to be measured further comprises a displaying of an indication of how to measure the dimension with the dimension measuring apparatus.

The method supports an operator while executing a measuring operation without hardcopy plans, tutorials and/or guides as well as without paper records.

In a preferred embodiment, the display is a see through head-mounted display. The see-through mounted display does neither limit the movement freedom of the operator, nor disturbing the concentration of the operator while executing the measurement. Furthermore, a couple of see-through head-mounted displays provide intrinsically Augmented Reality capabilities as well as 3D displaying capabilities.

In one embodiment, the dimension measuring apparatus is a portable measuring apparatus.

In a preferred embodiment, the dimension measuring apparatus is a portable, manually operated apparatus, such as a slide calliper, a micrometer, a height gauge, a tape rule, a Go/no go gauge.

In another embodiment, the measuring apparatus is a coordinate measuring machine (CMM), an arm of a CMM or a part of a CMM.

In one embodiment, it is a non-contact measuring machine such as a laser tracker or an optical measuring instrument In one embodiment, the electronic device is portable.

In one embodiment, the electronic device consists of a set of physically distinct elements interconnected by one or more data links. Some of the data links could be arranged to permit data exchange and/or access to elements that are located in a remote location.

In an embodiment, the method comprises a capture of a sequence of images by the camera and the recognition and/or identification with the processor of a pre-defined gesture and/or posture of the operator in the sequence of images. A pre-defined set of gestures and postures, in particular of hands and fingertips, could be used to interact with the device.

In one embodiment, the method comprises a step of displaying a representation of the model on the display. In an embodiment, the representation is displayed superimposing the object or part of the object within the captured image.

In a preferred embodiment, the representation is displayed on the see-though head mounted display or displays so that to superimpose the object within the field of view of the operator. The representation of the model displayed on the display could be manipulated by a set of pre-defined gestures or postures in particular of hands and fingertips, of the operator. The superposition the representation on the object or the image of the object enables the operator to identify inconsistencies between the model and the object In one embodiment, the method comprises a step of projecting a 3D holographic image of the part of the object or of the object. The holographic image could be manipulated by a set of pre-defined gestures or posture, in particular of hands and fingertips, of the operator.

In one embodiment, the method comprises a step of displaying a mark, in particular within the field-of-view of the operator or within the captured image, in order to indicate a surface of the object or extremities of the part of the object that have to be measured.

In one embodiment, where the measuring instrument is a CMM arm, the method comprises a step of displaying a mark which indicates the position of the arm for making the said measurement.

In one embodiment, the indication of the dimension that is intended to be measured comprises a range or interval of dimensions. In a preferred embodiment, the indication comprises a tolerance range or interval.

In a preferred embodiment, the method further comprises a displaying on the display of an indicator for indicating if the processed value is within said tolerance range or interval.

The processing of the value could be also based on model tolerances values of the part of the object and/or of the object.

In one embodiment, the method comprises a step of displaying an outcome of the processing of the value. Additional graphical elements could be displayed, in particular within the field-of-view of the operator or within the captured image, so that the outcome could be linked with the part of the object or with the object.

In one embodiment, the step of displaying the outcome comprises a step of displaying an indicator indicating that the processed value of the dimension measured by the dimension measuring apparatus is within the range or interval defined by the indication.

In one embodiment, the step of displaying the outcome comprises a step of displaying a mark in order to indicate the surface or the extremities of the part of the object already been measured.

In one embodiment, the step of acquiring the value includes a step of capturing an image of an analog display or scale of the dimension measuring apparatus in order to recognize or identify the indicated analog value and to convert into a digital value within the processor 5.

In one embodiment, the step of acquiring the value includes a step of capturing an image of a digital display of the dimension measuring apparatus in order to recognize the displayed value and to convert into a digital value within the processor 5.

In one embodiment, the step of acquiring the value of the dimension comprises a step of transmitting digital data from the dimension measuring apparatus to the processor via a data link.

In one embodiment, the method comprises a step of acquiring a temperature of the part of the object and/or of the object. Advantageously, a thermal sensor of the digital device could be used. The processing of the value could be also based on such temperature of the part of the object and/or of the object. In a preferred embodiment, an objet temperature warning indicator could be displayed on the display of the device.

In an embodiment, the method comprises a step of acquiring a temperature of the measuring apparatus. The temperature could be acquired from the apparatus to the processor via a data link. The temperature could be acquired with a thermal sensor of the digital device. The processing of the value could be also based on the temperature of the measuring apparatus. In a preferred embodiment, an apparatus temperature warning indicator could be displayed on the display of the device.

In an embodiment, the method comprises a step of acquiring an air temperature of a space surrounding the object. The temperature could be acquired with a thermal sensor of the digital device. The processing of the value could also be based on such temperature. In an embodiment, an air warning indicator could be displayed on the display.

In one embodiment, the step of recognizing and/or identifying of the object in the image is based on the object's shape or on a code affixed to the object.

In an embodiment, the method comprises a step of recognizing and/or identifying the measuring apparatus in the processor. The processing of the value of the dimension measured by the apparatus could be also based on the recognition and/or identification of the measuring apparatus.

In an embodiment, the step of recognizing and/or identifying of the measuring apparatus comprises a step of capturing an image of the measuring apparatus or of a part of the measuring apparatus with the camera. The step could further comprise a step of recognizing and/or identifying of the apparatus's shape and/or of a code affixed to the apparatus in such image.

In another embodiment, the recognizing and/or identifying of the measuring apparatus comprises a step of wireless contact or communication with the measuring apparatus.

In an embodiment, the step of wireless contact or communication with the instrument comprises a step of acquiring a calibration indication or parameter of the measuring instruments. The processor could realize an evaluation of the measuring accuracy of the apparatus by processing such calibration indicator or parameter. Such estimation could be displayed on the display. The step of processing the value of the dimension measured by the dimension measuring apparatus could be also based on such estimation. In a preferred embodiment, a calibration warning indicator could be displayed on the display.

In an embodiment, the step of wireless contact or communication with the instrument comprises a step of acquiring an accuracy indicator or parameter of the measuring instruments. The processor could realize an evaluation of the measuring accuracy of the apparatus by processing such accuracy indicator or parameter. Such estimation could be displayed on the display. The step of processing the value of the dimension measured by the dimension measuring apparatus could be also based on such estimation. In an embodiment, an accuracy warning could be displayed on the display.

In an embodiment, the method further comprises a capturing of at least an image of the part of the object during the measuring operations conducted by the operator.

In an embodiment, the step comprises a step of capturing an image of the part of the object and of a part of the measuring apparatus at the instant when the value of the dimension measured by the dimension measuring apparatus is acquired in the processor.

In an embodiment, the method further comprises a step of record and/or transmit values and/or outcomes and/or acquired images and/or estimations and/or acquired temperatures and/or displayed warnings and/or processor data to a database and/or to a terminal and/or to a server and/or to a processing unit.

In an embodiment, the method further comprises a step of receiving data from a database and/or from a terminal and/or from a server and/or from a processing unit. In particular, the step comprises a receiving of data trend for supporting the operator in dimension dispersion monitoring.

In an embodiment, the method further comprises a step of displaying an image or a sequence of images provided by the camera on the display of the device. In a preferred embodiment, the image or the sequence of images are numerically processed by the processor, in particular to provide zoomed and/or rotated image or sequence of images.

In an embodiment, the device further comprises a second camera.

In an embodiment, the method further comprises a step of displaying an image or a sequence of images provided by the second camera on the display.

In an embodiment, the device further comprises a depth camera or Light field camera.

In an embodiment, the method further comprises a step of displaying on the display an image or a sequence of images provided by the depth camera or Light field camera.

In an embodiment, the device further comprises a macro photography dedicated camera or microscope.

In an embodiment, the method comprises a step of displaying an image or a sequence of images provided the macro photography dedicated camera or microscope.

In an embodiment, the device further comprises a second display.

In an embodiment, the image or the sequence of image is displayed on the second display.

In an embodiment, the method comprises a step of displaying an approach vector of a probe head of a coordinate measurement machine or of an arm of a coordinate measurement machine on the display.

In an embodiment, the method further comprises a step of provide images and sounds to a database and/or to a terminal and/or to a server and/or to a processing unit.

In an embodiment, the method further comprises a step of receiving images and sounds from a remote database and/or from a remote terminal and/or from a remote server and/or from a processing unit.

In an embodiment, the method further comprises a step of provide remote guidance and/or supporting for supporting the operator in measuring the part of the object. In an embodiment, the method comprises a step of provide remote diagnostics.

In an embodiment, the method further comprises a step of providing work sequences training to the operator.

In an embodiment, the method comprises a step of proposing a measuring apparatus for measuring the part of the object. Indications of the apparatus could be displayed on the display 3. A measuring apparatus warning could be displayed.

Respect to prior art, the invention provides a method for supporting an operator executing a metrology operation by providing a synergy from operator skills, capabilities of augmented reality device and measurements apparatus capabilities.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

The present invention concerns an augmented reality device and a method for supporting an operator in metrology operations.

The invention permits in particular to speed up measuring operations and to reduce service operations costs.

Figure 1:
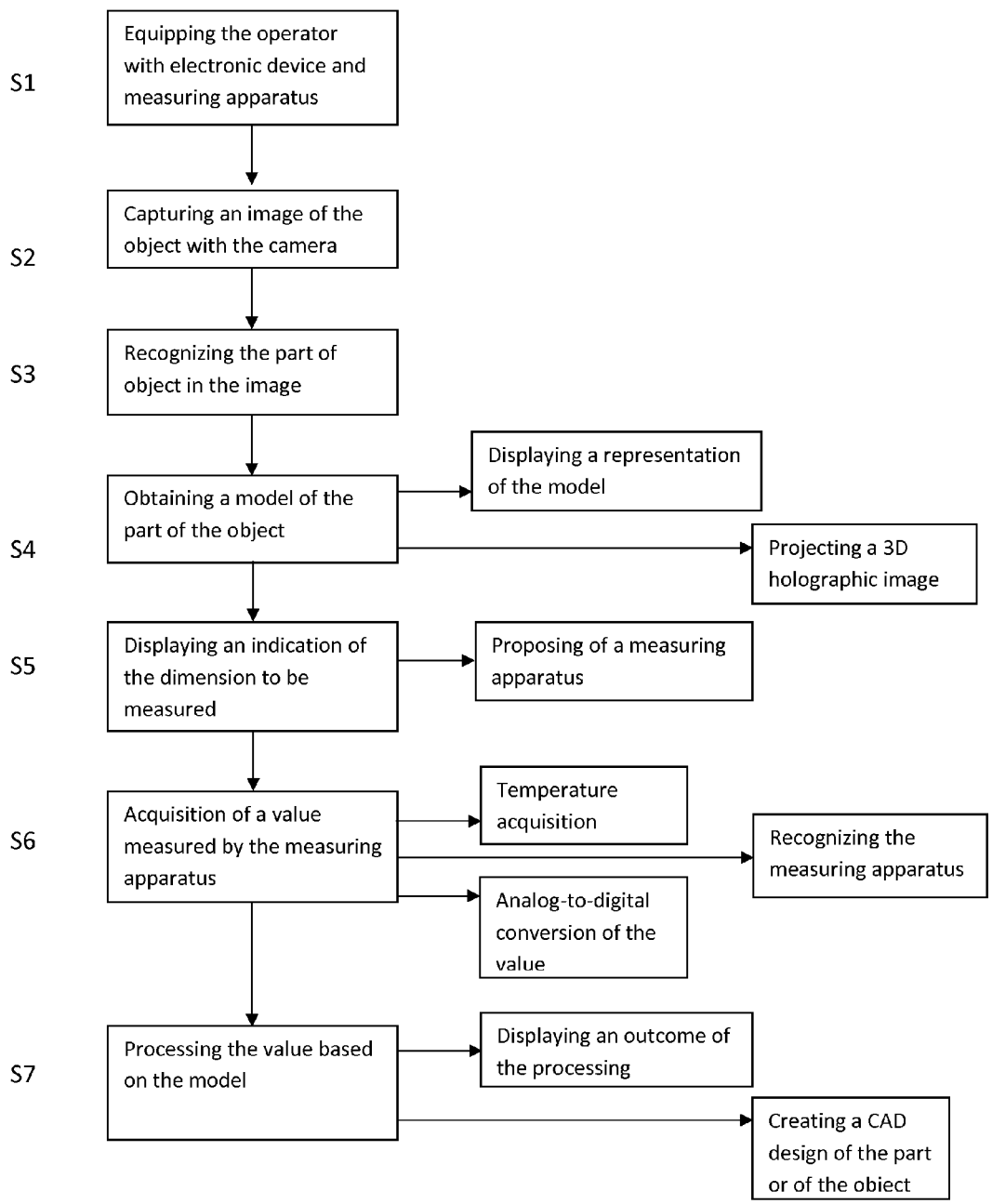
FIG. 1 shows a flow diagram of a method according to the invention.
Figure 2:
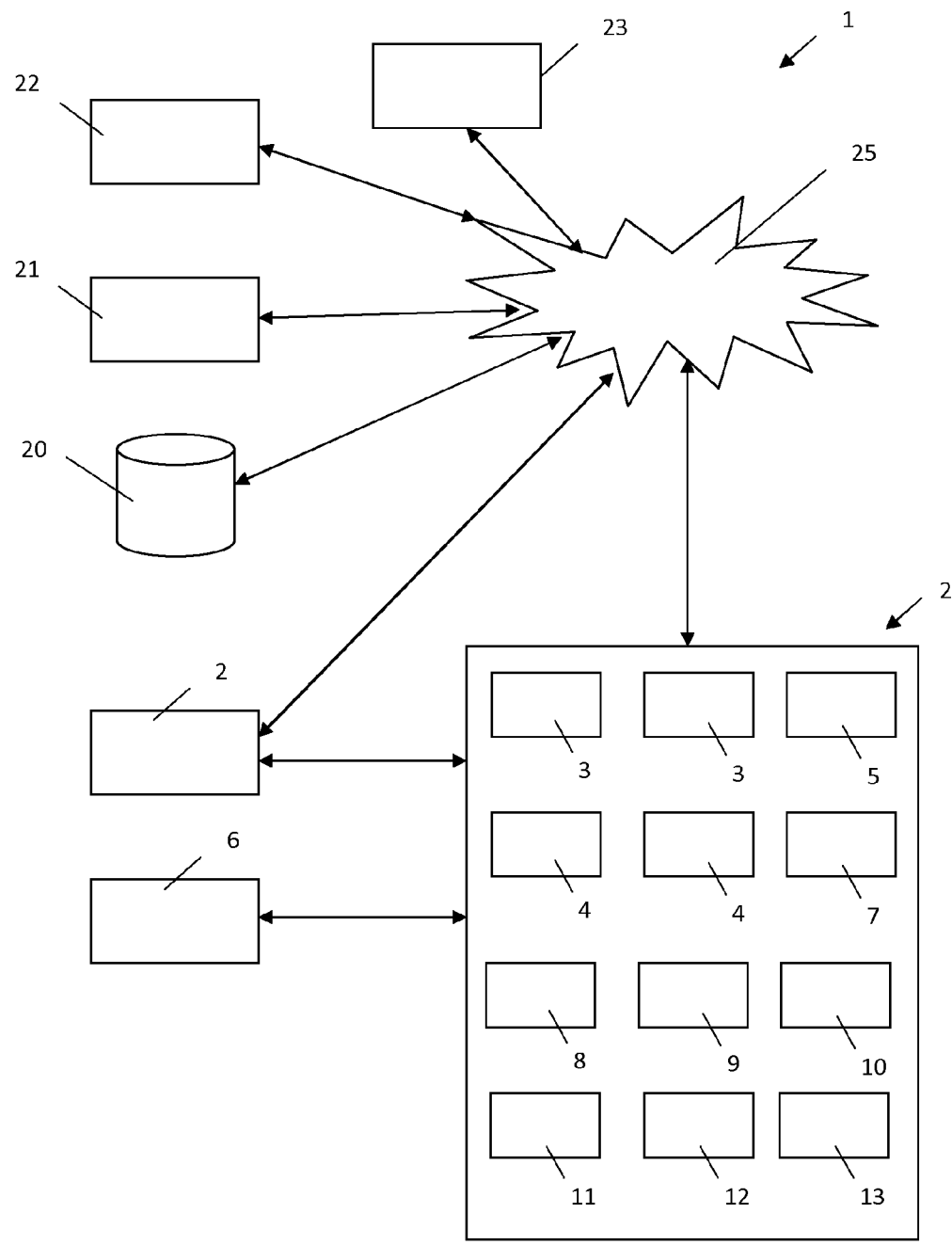
FIG. 2 shows a view of a system comprising an augmented reality device according to the invention.

FIGS. 1 and 2 show a method and a device 2 supporting an operator in measuring a part of an object. The method and the device could provide a synergy from operator skill, capabilities of augmented reality and measurements apparatus features. Some embodiments of the invention could provide a synergy further comprising data transmission from/to local and/or remote electronic devices or computers.

According to the invention, an operator is supported in measuring a part of an object by equipping the operator with an electronic device 2 comprising a see-though head mounted display 3, at least one camera 4, and a digital processor 5 and with a dimension measuring apparatus 6 (step S1).

The dimension measuring apparatus 6 could be a manually operated, portable measuring apparatus, such as a slide caliper, a micrometer, a height gauge, a tape rule or a Go/no go gauge.

Advantageously, the dimension measuring apparatus could be a Vernier scaled caliper, a Vernier-scaled micrometer, a dial caliper, a dial micrometer or a gauge with Vernier scale or dial indicator.

The measuring apparatus could be a Coordinate Measurement Machine (CMM), in particular a portable or a transportable Coordinate Measurement Machine, an arm of a CMM or a laser tracker.

The display could be a distinct portable display or a display of a wireless-connectable portable device or tablet.

Advantageously, the display is a see-through head mounted display. The see-through head mounted display provides movement freedom to the operator, releasing him from reserving a hand to support the display or from losing time and resources to find an appropriate arrangement for support the display. This advantage is immensurable in case the operator is executing a measurement, in particular involving a portable measuring apparatus, such as a slide caliper, a micrometer, a height gauge, a tape rule or a Go/no go gauge. Furthermore, the see-through head mounted display frees the operator from the necessity of repetitively direct his gaze apart to check the display. Independently of the body and extremities positioning of the operator, the display is always within or in the periphery of the field of view of the operator. Furthermore, the see-through head-mounted display provides intrinsically augmented reality (AR) capabilities while a couple of see-through head-mounted displays provide intrinsically 3D displaying capabilities.

The electronic device 2 could comprise a Head-mounted unit that supports the see-though head mounted display 3. Preferably, the Head-mounted unit comprises two see-though head mounted displays 3, a first display 3 arranged to be located in the field of view of the right eye of the operator, a second display 3 arranged to be located in the field of view of the left eye of the operator. The dual-display embodiment could provide, in particular, 3D images displaying.

According to the invention, the electronic device 2 or part of the electronic device 2 is portable. The electronic device could consist of a set of physically distinct elements interconnected by one or more data links. Some of the data links could be arranged to permit data exchange and/or remote access to elements that are located in a remote location. The device 2 could comprise a communication unit 8 in order to send and receive data, in particular wireless with another device 2, a remote database 20, a server 21, a processing unit and/or a terminal 22.

The step S2 comprises the capturing of an image of the object with the camera 4.

The processor 5 processes the image in order to recognize the part of the object in the image that has been indicated to the operator as part to be measured (step S3).

Alternatively, the processor 5 could identify a part or a plurality of parts of an object that that should or could be measured. The processor could dispose of a list of pre-selected parts that should or could be measured.

The step of recognizing and/or identifying of the object in the image could be based on recognition or identifying the object's shape. A code could be affixed to the object in order to recognize or identify the object. For example, a code bar could be affixed to the object or part of the object so that the processor could identify or recognize the part of the object by reading, identifying or recognizing the code captured in the image.

The identifying or recognizing operation could be supported by a database stored in accessible memory 7 or acquired through a connectable element. The database could list tagged parts of the object or objects with additional identification or recognition information (e.g. shape information).

The processor 5 could send the image of the part of the objet and/or the image of the code to a remote element (e.g. another device 2, a database 20, a server 21, a processing unit 23, or a terminal 22) in order to obtain additional information or to identify or recognize the part(s).

Preferably, the method could comprise a step of displaying a mark on the display 3 in order to indicate the part of the object to be measured. The mark could be superimposed in the field-of-view of the operator or could be superimposed the part of the object within a captured image. For example, the mark could be an arrow or a plurality of arrows indicating a surface of the object or extremities of the part of the object that have to be measured. A colour could be superposed within the field of view of the operator or within a captured image, through the display or displays 3, in order to highlight a surface of the object or extremities of the part of the object that have to be measured.

Preferably, the method further suggests, by means of the electronic device, an operative procedure for measuring the dimension with the dimension measuring apparatus. The operative procedure could be suggested by means of the display 3 and/or by earphones 10 equipping the device 2.

The method could comprise a step of displaying on the display 3 of an indication of how to measure the dimension with the dimension measuring apparatus 6. The indication could be an image or a sequence of images that could be superimposed in the field-of-view of the operator or could be superimposed the part of the object within a captured image.

In step S4, a model of the part of the object is obtained.

Any representation of the object that can be reproduced on a display could be used as object model, in the frame of the invention. In particular, but not exclusively, the model could be a digitalized sketch, a mathematical or computer model, a 2D drawing, a 3D representation, a 3D CAD image, or a 3D master object or a digital representation thereof, a statistical model of the surfaces dimensions of part of the object or of the object.

In a preferred embodiment, the method further comprises a step of obtaining information related to the part of the object and/or to the model. The information could comprise measurement procedures, plans, instructions, notes and/or warnings. The information could further concern production process of the object, e.g. information on assembly, production process, as well as production, storage or delivering batches. Advantageously, the information could comprise a work sequence for training the operator. A sequence training or a set of work sequence training could be used to train, drill, improve and maintain operator's capabilities and skills. The method further comprises a step of displaying the information, in particular to provide a support and a guiding to the operator in complex measurement procedures without hard-copy plans, tutorials and guides.

The processor could obtain the model and/or the information from a database stored in an accessible memory 7 of the device. The model and/or information could be remotely obtained from a database 20, from a server 21 and/or from a terminal 22 through a network 25. The model and/or information could be obtained from another device 2.

The method could comprise a step of displaying a representation of the model on the see-though head mounted display 3. The representation could be a computer-aided design (CAD) image, a digitalized image or a digital representation. The displayed representation could be a 2D image that could be displayed on the display 3. A 3D representation could be displayed, for example by displaying a first 2D representation on the first display 3, that is located in the field of view of the right eye of the operator, and a second 2D representation on the second display 3, that is located in the field of view of the left eye of the operator. Alternatively, a single display having 3D capabilities could be used.

The method could comprise a capturing of a sequence of images by the camera 4 so that the processor 5 could recognizing/identifying within the sequence a pre-defined gesture and/or posture of the operator. A pre-defined set of gestures and postures, in particular of hands, fingers and/or fingertips, could be defined to interact with the device. Advantageously, a second pre-defined set of gestures and postures could be defined in order to interact with the measuring apparatus 6 through the device 2. For example, a gesture of holding an object between some fingertips of the operator could instruct the device 2 to manage and acquire a measure of the object through the measuring apparatus 6. Alternatively, the processor 3 could locate the position of the fingertips in space through the camera 4 in order to manage and display some marks on the display 3 or to acquire and/or display distances between fingertips positions.

The representation of the model displayed on the display could be manipulated (e.g. rotation, zooming or shrinking) by a set of pre-defined gestures or postures of the operator. The superposition of the representation on the object or a captured image of the image enables the operator to check visually the consistency of the model and object before performing measurements.

The method could comprise a step of projecting a 3D holographic image of the part of the object or of the object. The holographic image could be manipulated by a set of pre-defined gestures or posture of the operator. The set could comprise gestures for image displayed/un-displaying, image rotation, image zooming and image shrinking.

Step S5 comprises a step of displaying on the display 3 an indication of the dimension that is intended to be measured.

The indication of the dimension could comprise a range or an interval of dimensions, in particular a tolerance range or interval. The indication could comprise a minimal value and a maximal value of the dimension. The indication could comprise a dimension and a margin of error. The indication could comprise a positive margin of error and/or a negative margin of error.

In the step S6, the method comprises a step of acquiring in the processor a value of the dimension measured by the dimension measuring apparatus 6.

This step could further comprise a step of recognizing and/or identifying the measuring apparatus in the processor 5. The acquired value of the dimension measured by the apparatus could be processed taking in account measuring features and/or measuring model of the identified/recognized measuring apparatus.

The recognizing and/or identifying the measuring apparatus 6 provides, in particular, automatic or semi-automatic traceability means of the measuring apparatus 6.

The method could comprise a step of transmitting digital data from the dimension measuring apparatus 6 to the processor 5 via a data link.

The recognizing and/or identifying of the measuring apparatus could comprise a step of wireless contact or communication with the measuring apparatus. In particular, an apparatus identification could be acquired. The identification could be a model type or a serial number of the apparatus.

A calibration indication or parameter, in particular an alert indicating that the instrument that is "out-of-calibration", of the measuring apparatus could be wirelessly acquired. The processor 5 could then realize an evaluation of the measuring accuracy of the apparatus by processing such calibration indicator or parameter. The estimation could be displayed on the display 3. In case of the estimation would exceed a pre-defined threshold, a calibration warning indicator could be displayed on the display 3. In case the device 2 would receive an alert generated by the apparatus, a warning indicator and/or the alert could be displayed on the display 3.

The processing of the value of the dimension measured by the apparatus could be also based on the accuracy estimation.

An accuracy indicator or parameter of the measuring instruments could be wireless acquired. The processor could realize an evaluation of the measuring accuracy of the apparatus by processing the accuracy indicator or parameter. Such estimation could be displayed on the display 3. In case of the estimation would exceed a pre-defined threshold, an accuracy warning could be displayed on the display 3.

The method could propose a measuring apparatus for measuring the part of the object. The proposition of the measuring apparatus could be based on the most appropriate apparatus or on the more appropriate available apparatus. Indications of the apparatus could be displayed on the display 3. In case the processor would acquire a value from another measuring apparatus or in case of the processor would recognize or identify another measuring apparatus, a measuring apparatus warning could be displayed on the display 3.

The method could provide a list of measuring apparatus that are adapted to execute the measuring operation. The list could be entirely or partially displayed on the display 3. The list could comprise models, batches and/or serial numbers of measuring apparatus. In case the processor would acquire a value from a measuring apparatus not listed or in case of the processor would recognize or identify a measuring apparatus not listed, a measuring apparatus warning could be displayed on the display 3.

The method could provide a list of measuring apparatus that are obsolete for measuring the part of the object. In case the processor would acquire a value from one of said measuring apparatus or in case of the processor would recognize or identify one of said obsolete measuring apparatus, an obsolete measuring apparatus warning could be displayed on the display 3.

The acquisition of a value of the dimension measured by the dimension measuring apparatus could comprise a step of capturing an image of a display or of a part of the dimension measuring apparatus 6 in order to recognize or identify the indicated value of the measure. This step provides an acquisition of an analog or digital value provided by a measuring apparatus without establishing a data link between the apparatus 6 and the device 2. In particular, analog reading of pure mechanical measuring apparatus could be captured and converted to digital value within the device 2.

The image could be processed in order to identify the region of the image showing a digital display of the measuring apparatus displaying a numerical representation of the measured value. An optical character recognition (OCR) could then be applied on this region of the image so that the displayed value could be converted in a digital format within the processor 5 of the device 2. This step is extremely important in case of equipping an operator with a simple electro-mechanical measuring apparatus, as a caliper with digital dial indicator, a micrometer with digital dial indicator or a gauge with digital dial indicator. Actually, the measured value could be automatically acquired, freeing either the operator from reading and manually introducing the measured value into the device 2, or the operator from proceeding with complex and time-consuming operations of manually establish a data link between the apparatus and the device 2.

Alternatively, the image could be processed in order to identify the region of the image showing an analog display or indication of the measuring apparatus indicating the measured value, as for example, a Vernier scale or an analog dial. This region of the image is then processed by means of image processing technics so that the indicated value could be recognized and then converted in a digital format within the processor 5 of the device 2. The analog-to-digital conversion of the value measured by the measuring apparatus 6 is extremely important in case of the operator is equipped with a substantially mechanical measuring apparatus, as a Vernier scaled caliper, a Vernier-scaled micrometer, an analog dial caliper, an analog dial micrometer or a gauge with Vernier scale or analog dial indicator. Actually, the measured value could be automatically acquired, freeing the operator from reading and manually introducing the measured value into the device 2.

The step of recognizing and/or identifying of the measuring apparatus could comprise a step of capturing an image of the measuring apparatus, or of a part of the measuring apparatus. This image is then processed by the processor 5 in order to recognize and/or identify the apparatus. The processing could be based on recognizing apparatus's shapes or on the identification of serial numbers or codes affixed to the apparatus. Measuring apparatus incapable to communicate with the device 2 could be thus identified or recognized. In particular, mechanical measuring apparatus could be identified or recognized by the processor 5 of the device 2.

The identifying or recognizing operation could be supported by a database stored in accessible memory 7 or acquired through a connectable element that lists measuring apparatus with additional information. The information could concern apparatus identification, accuracy features, measuring model, serial numbers, set-up instructions, as well as usage warnings. The information could comprise measuring instruction so that the operator could be supported and guided during complex measurement or during measurement with the measuring apparatus.

Advantageously, the method could comprise a step of acquiring a temperature of the part of the object and/or of the object with a thermal sensor 9 of the digital device 2. In case of the temperature of the part of the object and/or of the object would exceed a pre-defined minimal or maximal threshold, an object temperature warning could be displayed on the display 3.

A thermal IR sensor could be used to acquire the temperature of the part of the object and/or of the object. Preferably, the thermal IR sensor is comprised in the Head-mounted unit. Alternatively, the thermal IR sensor 9 could be comprised in an additional portable or Head-mounted unit of the device 2.

A temperature of the measuring apparatus 6 could be acquired directly from the apparatus to the processor via a data link. Alternatively, a temperature of the measuring apparatus could be acquired with the thermal sensor 6 of the digital device. In case of the temperature of the measuring apparatus 6 would exceed a pre-defined minimal or maximal threshold, an apparatus temperature warning could be displayed on the display 3.

An air temperature of a space surrounding the object could be acquired. In case of the air temperature of the space surrounding the object would exceed a pre-defined minimal or maximal threshold, an air temperature warning could be displayed on the display.

The method could comprise a step of capturing an image of the part of the object and of a part of the measuring apparatus, in particular at the instant when measurement is executed or at the moment when the value of the dimension measured by the dimension measuring apparatus is acquired in the processor. The image could provide information for remote or off-line quality monitoring and for skill improvement of the operator.

Step S7 concerns a step of processing the value of the dimension measured by the dimension measuring apparatus 6 based on the obtained model.

The processing of the value could be also based on measuring features, accuracy estimations, and/or measuring model of the identified or recognized measuring apparatus.

The processing of the value could be also based on measured or acquired temperatures, dilation models of the part of the object or of the object.

The processing of the value could be also based on measured or acquired temperatures, dilation models of the identified or recognized measuring apparatus.

Preferably, the method comprises a step of displaying an outcome of the processing of the value on the see-though head mounted display 3. Additional graphical elements could be displayed in the field-of-view of the operator so that the outcome could be linked with the measured part of the object.

The step of displaying the outcome could comprise a step of displaying a mark on the display superimposing the surface or the extremities within the field of view of the operator or within a captured image of the part that are already been measured. The mark could be an arrow or a plurality of arrows indicating the surface or the extremities. In another embodiment, a colour is displayed on the display in order to indicate the surfaces already measured within the field-of-view of the operator or within a captured image. The marker could be superimposed on the field-of-view of the operator or within a captured image in order to link the marker with the object viewed by the operator through the see-trough display 3. The marker could be superimposed on a displayed model, image or representation of the object.

The outcome could comprise a step of displaying of "in-range" indicator, The indicator indicates if the value or the processed value would fall within the range or interval indicated by the indication. For example, a green marker could be displayed if the outcome is within the range or interval indicated by the indication, otherwise a red one.

The method could comprise a step of capturing a plurality of images of the part of the object during the measuring operations conducted by the operator. Additional images could be provided by a depth camera or light-field camera 12 that could equip the device 2. The images and the values of the dimensions measured by the dimension measuring apparatus could be a base for creating a numerical representation of the part of the object or of the object, in particular a CAD image. The creation of the model could be led by a set of pre-defined gestures or posture of the operator.

The processing or part of the processing could be executed by the microprocessor 5 of the device 2.

Alternatively, a data-linked local or remote element could be assigned to execute part of the processing or the entire processing. In particular, a server 21 or a specialized processing unit 23 could be assigned for processing the value. In one possible configuration, the processor of the device is a programmable or pre-programmed electrical circuit adapted to execute tasks of data displaying, data exchanging and data acquisition within the device 2.

The method could advantageously comprise a step of record and/or transmit values, temperatures, images, outcomes, estimations, warnings and/or processor data to a local or remote database 20, terminal 22, processing unit 23 and/or server 21. This provides data acquisition permitting both real-time and offline quality monitoring of metrology operations.

The method could comprise a step of receiving data from a remote element, in particular from a database 20 and/or from a remote terminal 22. Advantageously, the method could comprise a step of receiving data trend to monitor dimension dispersion. The data could be displayed in the display 3, advantageously in form of histogram, graphic or confidence intervals. A marker displayable on the display 3 could be used to indicate a relationship between the outcome or the acquired value and the received data.

The method could comprise a step of displaying an image or a sequence of images provided by the camera 4 on the display 3. Eventually, additional image or a sequence of images could be provided by a second camera and/or by a depth camera or light-field camera 12 that could be comprised in the device 2. A 3D image or a sequence of 3D images could be displayed on a couple of display, in particular on a couple of see-through head-mounted displays or on a single display having 3D capabilities. Advantageously, the image or the sequence of images is digitally processed by the processor in order to provide, for example, 3D and/or zoomed image or images for supporting the operator in measuring operations. Advantageously, the displaying of 3D images could be managed and/or manipulated by the operator.

The method could comprise a step of enlarging displaying an image or a sequence of images provided by a macro photography dedicated camera or microscope 13 equipping the device 3. For example, the displayed image could support the operator showing enlarged details as well as more detailed images of a part or some parts of the object. A detailed image of a surface of a part of the object could provide additional information to the operator, for example, for estimating roughness of the object.

The method could comprise a step of displaying on the display 3 an approach vector of a probe head of a CMM arm or of a CMM. In particular, the displaying on a 3D display of the approach vector superposing the object or parts of the object within a 3D image or sequences of 3D images could further support the operator during his measurement operations. Alternatively, the approach vector could be displayed on the see-through Head mounted displays so that the displayed vector could be superposed the object or part of the object within the field-of-view of the operator. The method could further comprise a step of providing a live image and live sounds to a remote database 20, to a remote terminal 22, to a processing unit and/or to a remote server 21. The device 2 or the Head-mounted unit of the device 2 could further comprise a sound recording unit, for example a microphone 11. Verbal values of the dimension measured by the dimension measuring apparatus could be thus acquired by the device 2 through the microphone 11.

The method could comprise a step of receiving image and sounds from a remote database 20, from a remote terminal 22, from a processing unit 23, from a remote server 21 and/or from another device 2.

The method could comprise a step of receiving live image and live sounds from a remote terminal 22, from a remote server 21 and/or from another device 2.

The device 2 or the Head-mounted unit of the device 2 could comprise a sound reproduction unit, for example earphones 10. Verbal or visual instructions could be given to the operator through the device 2.

The method could provide remote guidance and/or supporting for supporting the operator in measuring the part of the object. Advantageously, the method could provide remote diagnostics for supporting the operator, in particular for solving measuring problems encountered by the operator during the measurement of the part of the object.

LIST OF ELEMENTS USED IN DRAWINGS

1 System
2 Device
3 Left/Right Display
4 Camera
5 Digital processor
6 Measuring apparatus
7 Memory
8 Communication unit
9 Thermal sensor
10 Earphones
11 Microphone
12 Light-field camera
13 Microscope
20 Database
21 Server
22 Terminal
23 Processing unit
25 Network
S1-S7 Method Steps

The invention claimed is:

1. A method for supporting an operator in measuring a part of an object, comprising the steps of:
   Equipping said operator with
      an electronic device comprising a see through head mounted display, at least a camera, and a digital processor;
      and with a dimension measuring apparatus;
   Capturing an image of said object with said at least a camera;
   Recognizing and/or identifying with the processor said part of the object in the image;
   Obtaining a model of said part;
   Displaying on the display an indication of the dimension that is intended to be measured;
   Acquiring in the processor a value of the dimension measured by the dimension measuring apparatus;
   Processing said value based on the model.

2. The method of claim 1, further comprises suggesting, by means of the electronic device, an operative procedure for measuring the dimension with the dimension measuring apparatus.

3. The method of claim 1, wherein said dimension measuring apparatus is a manually operating, portable measuring apparatus, such as a slide caliper, a micrometer, a height gauge, a tape rule, a Go/no go gauge.

4. The method of claim 1, wherein said dimension measuring apparatus is a Coordinate Measurement Machine, an arm of a Coordinate Measurement Machine, a laser tracker or an optical measuring apparatus.

5. The method of claim 1, wherein the electronic device is portable.

6. The method of claim 1, wherein the electronic device consists of a set of physically distinct elements interconnected by one or more data links.

7. The method of claim 1, comprising displaying on said display a representation of the model superimposing the object within a captured image or within the field of view of the operator.

8. The method of claim 1, comprising displaying an outcome of said processing on the display.

9. The method of claim 1, wherein said indication of the dimension that is intended to be measured comprises a tolerance range or interval.

10. The method of claim 1, further comprising a step of displaying on the display an indicator for indicating if the processed value is comprised within said tolerance range or interval.

11. The method of claim 1, wherein said step of acquiring a value comprises a step of capturing an image of an analogue display or indication of the dimension measuring apparatus in order to recognize or identify the indicated analogue value and to convert into a digital value within the processor.

12. The method of claim 1, wherein said acquiring a value of the dimension comprises transmitting digital data from the dimension measuring apparatus to the processor via a data link.

13. The method of claim 1, comprising acquiring a temperature of the object with a thermal sensor of the digital device, wherein said processing is also based on said temperature.

14. The method of claim 1, comprising acquiring a temperature of the measuring apparatus from the apparatus to the processor via a data link or acquiring a temperature of the measuring apparatus with a thermal sensor of the digital device, wherein said processing is also based on said temperature of the measuring apparatus.

15. The method of claim 1, wherein said recognizing and/or identifying of the object in the image is based on the object's shape or on a code affixed to the object.

16. The method of claim 1, comprising recognizing and/or identifying the measuring apparatus in the processor wherein said processing is also based on said recognition and/or identification.

17. The method of the claim 16, wherein said recognizing and/or identifying of the measuring apparatus comprises a step of capturing an image of the measuring apparatus with said at least a camera and a step of recognizing and/or identifying of the apparatus's shape and/or of a code affixed to the apparatus in said image.

18. The method of the claim 16, wherein said recognizing and/or identifying of the measuring apparatus comprises a step of wireless contact or communication with the measuring apparatus.

19. The method of claim 1, further comprising a step of proposing a measuring apparatus for measuring the part of the object.

* * * * *